United States Patent
Arthurs et al.

(10) Patent No.: US 10,761,837 B2
(45) Date of Patent: *Sep. 1, 2020

(54) ANNOTATIONS IN SOFTWARE DEVELOPMENT

(71) Applicant: International Business Machines Corporation, Armonk, NY (US)

(72) Inventors: Brendan P. Arthurs, Dublin (IE);
Mark A. McGloin, Dublin (IE);
Andrew T. Penrose, Dublin (IE);
Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/140,749

(22) Filed: Apr. 28, 2016

(65) Prior Publication Data

US 2017/0039065 A1 Feb. 9, 2017

Related U.S. Application Data

(63) Continuation of application No. 14/817,279, filed on Aug. 4, 2015.

(51) Int. Cl.
*G06F 9/44* (2018.01)
*G06F 8/73* (2018.01)
*G06F 11/36* (2006.01)

(52) U.S. Cl.
CPC .............. *G06F 8/73* (2013.01); *G06F 11/36* (2013.01)

(58) Field of Classification Search
CPC ............. G06F 11/3648; G06F 11/3625; G06F 11/3672; G06F 11/3688
See application file for complete search history.

(56) References Cited

U.S. PATENT DOCUMENTS

| 8,375,443 | B1 | 2/2013 | Reis et al. | |
| 9,098,315 | B1 * | 8/2015 | Kapoor | G06F 9/541 |
| 2005/0021689 | A1 * | 1/2005 | Marvin | G06F 8/31 |
| | | | | 709/220 |
| 2005/0071633 | A1 * | 3/2005 | Rothstein | G06F 21/51 |
| | | | | 713/167 |

(Continued)

FOREIGN PATENT DOCUMENTS

EP 2051179 A1 4/2009

OTHER PUBLICATIONS

Nobakht et al. "Monitoring method call sequences using annotations"; Science of Computer Programming; Nov. 15, 2014; pp. 362-378; vol. 94, Part 3; Elsevier.

(Continued)

*Primary Examiner* — Chat C Do
*Assistant Examiner* — Lenin Paulino
(74) *Attorney, Agent, or Firm* — William H. Hartwell; Alex L. Ashworth; Arnold B. Bangali

(57) ABSTRACT

Embodiments of the present invention provide systems and methods for self-certification by a developer that the software components used during development are used in a secure manner, through the use of annotations. Input and return conditions are defined in an annotation for the software components of a system. The input and return conditions are compared for a match and a warning is generated when the input and return conditions do not match.

5 Claims, 5 Drawing Sheets

(56) References Cited

U.S. PATENT DOCUMENTS

| | | | | |
|---|---|---|---|---|
| 2006/0225053 | A1* | 10/2006 | Lakshman | G06F 8/437 |
| | | | | 717/140 |
| 2007/0150935 | A1* | 6/2007 | Satoh | G06F 21/54 |
| | | | | 726/1 |
| 2010/0205673 | A1 | 8/2010 | Burrell et al. | |
| 2010/0325620 | A1* | 12/2010 | Rohde | G06F 9/44589 |
| | | | | 717/154 |
| 2012/0102458 | A1* | 4/2012 | Meijer | G06F 8/73 |
| | | | | 717/123 |
| 2012/0297372 | A1* | 11/2012 | Berg | G06F 11/3604 |
| | | | | 717/131 |
| 2013/0042152 | A1* | 2/2013 | Fryc | G06F 11/3684 |
| | | | | 714/38.1 |
| 2013/0185697 | A1* | 7/2013 | Farchi | G06F 8/71 |
| | | | | 717/113 |
| 2014/0040863 | A1* | 2/2014 | Hale | G06F 8/36 |
| | | | | 717/123 |
| 2014/0108438 | A1* | 4/2014 | Duffy | G06F 8/433 |
| | | | | 707/756 |
| 2014/0237594 | A1 | 8/2014 | Thakadu et al. | |

OTHER PUBLICATIONS

Solotandem; "Secure Code Review"; Drupal.org; Jul. 30, 2010; pp. 1-2; <https://www.drupal.org/project/secure_code_review>.

U.S. Appl. No. 14/817,279, filed Aug. 4, 2015; Entitled "Annotations in Software Development".

List of IBM Patents or Patent Applications Treated as Related; Dated Apr. 28, 2016; 2 pages.

\* cited by examiner

ANNOTATIONS IN SOFTWARE DEVELOPMENT

BACKGROUND OF THE INVENTION

The present invention relates generally to the field of software development, and more particularly to providing a mechanism to certify that APIs are being used in a secure manner through the use of annotation.

In software development, a developer may use third party libraries or API calls when building systems. Depending on the manner in which the APIs are used, there may be security vulnerabilities to account for. As part of the development process, organizations may often perform security reviews of their code, in order to determine if the APIs and/or other third party libraries are used in a secure manner.

SUMMARY

According to one embodiment of the present invention, a method is provided, comprising: determining, by one or more processors, a first software component, wherein the first software component comprises an annotation defining an input condition for the first software component; identifying, by one or more processors, a second software component, wherein the second software component comprises an input for the first software component; determining, by one or more processors, whether the second software component includes an annotation defining a return condition which matches the annotation defining the input condition for the first software component; and in response to determining that the second software component does not include an annotation defining a return condition which matches the annotation defining the input condition for the first software component, generating, by one or more processors, an output.

Another embodiment of the present invention provides a computer program product, based on the method described above.

Another embodiment of the present invention provides a computer system, based on the method described above.

DETAILED DESCRIPTION

Embodiments of the present invention provide systems and methods for self-certification by a developer that the various software components (such as APIs) are being used in a secure fashion, through the use of annotations.

Figure 1:
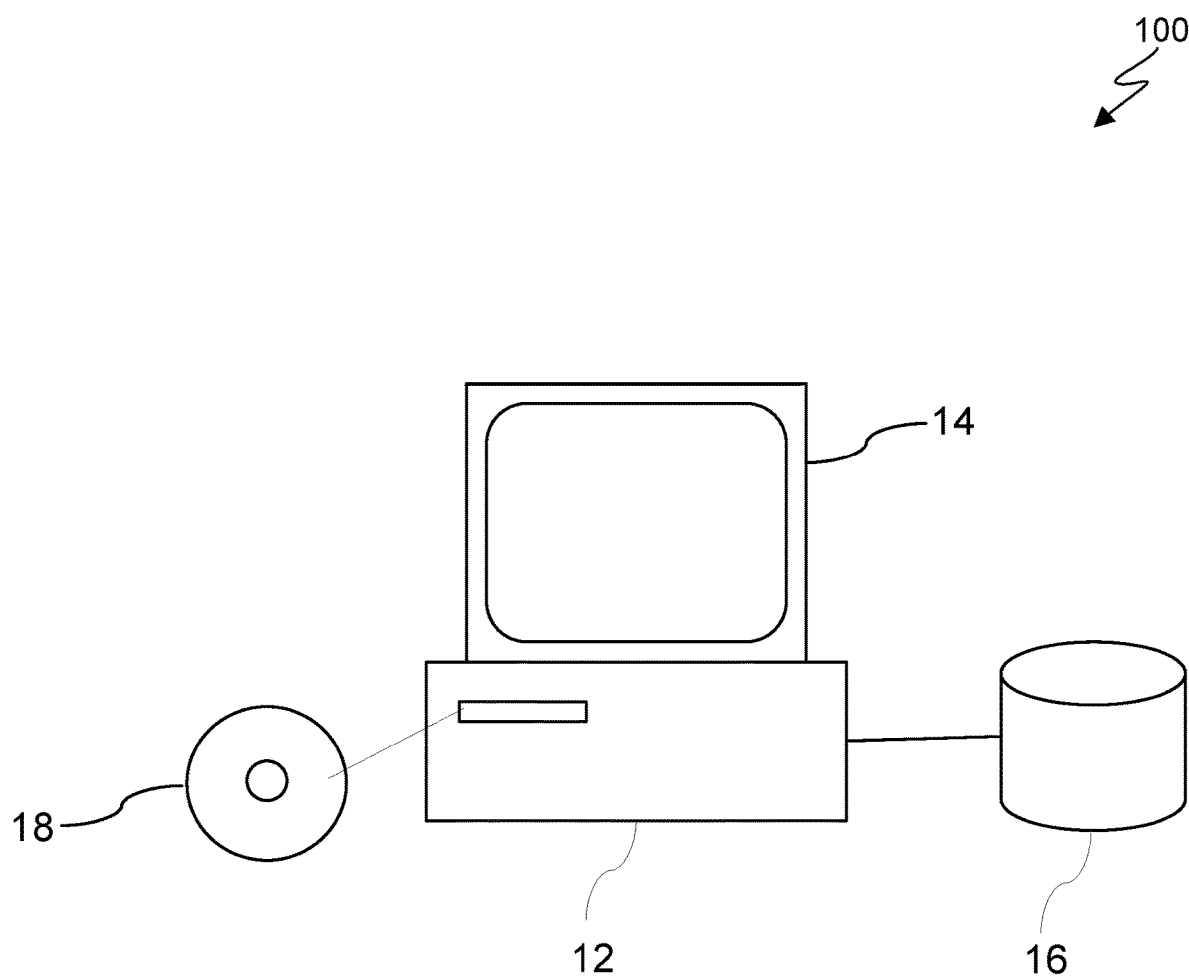
FIG. 1 is a functional block diagram illustrating a system, in accordance with an embodiment of the present invention.

The present invention will now be described in detail with reference to the Figures. FIG. 1 is a functional block diagram illustrating a system that can be used by a software developer in a software development process, generally designated 100, in accordance with an embodiment of the present invention. Modifications to system 100 may be made by those skilled in the art without departing from the scope of the invention as recited by the claims. In an exemplary embodiment, system 100 includes processor 12, a display device 14 connected to processor 12, and storage device 16 also connected to processor 12.

Processor 12 can be controlled by a computer program product stored on computer readable medium 18, for example a CD-ROM. The computer program product comprises a set of instructions that can be executed by processor 12 in order to operate system 100. In this exemplary embodiment, processor 12 operates a software developer kit that the developer can access via a graphical user interface (GUI) displayed on display device 14. Storage device 16 stores the software components created in the software development process.

In this exemplary embodiment, system 100 provides a self-service security review that is driven by annotations within the software components that are being created. System 100 delivers a process that can be used in one embodiment to automate a security review and therefore perform a check. Some embodiments of the present invention may include one, or more, of the following features, characteristics, and/or advantages: (i) provides for an automated check which saves development time and money; and/or (ii) improved security control points.

In this exemplary embodiment, an API being called uses an annotation to specify one, or a set, of security requirements expected when using the API, and the caller of that API uses a corresponding annotation to verify or self-certify that they are meeting that set of security requirements. This means that any software component, such as an API or block of code, that has security requirements will specify those conditions in the annotations. The conditions are either: (i) input conditions which specify requirements for the input to the component, or (ii) a return condition which defines that the return string from the component has been approved, according to the specified condition.

Figure 2:
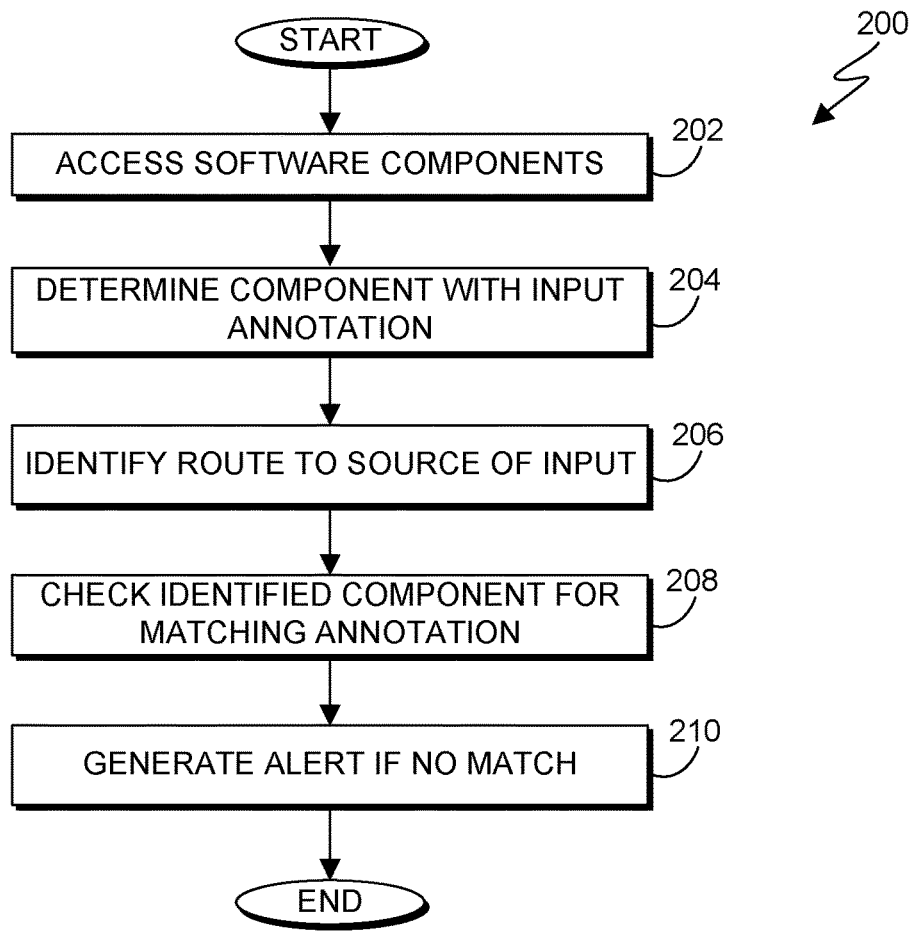
FIG. 2 is a flowchart illustrating operational steps for using annotations to verify that software components do not contain security vulnerabilities, in accordance with an embodiment of the present invention.

FIG. 2 is a flowchart illustrating operational steps for using annotations to verify that software components do not contain security vulnerabilities, in accordance with an embodiment of the present invention.

In step 202, the system accesses software components. In this exemplary embodiment, the software components are stored by storage device 16 and are accessed at compile time, for example, when the source code made up by the software components is compiled. In other embodiments, the software components are accessed periodically, as the software components are authored or changed.

In step 204, the system determines a component that includes an input annotation. In this exemplary embodiment, the system determines a first software component (e.g., an API) that includes an annotation defining an input condition for the first software component. At this point, a software component that has at least one annotation attached is identified, with a view to ensure that there is consistency in respect of the annotation(s) for the specific software component.

In step 206, processor 12 identifies a route to the source of input component. In this exemplary embodiment, processor 12 identifies a second (i.e., different) software component which provides an input to the first software component. Processor 12 may identify a route through the multiple software components, to the ultimate source of the input. For example, if an annotation defines that an input to the first software component must be security checked in a specific manner, then processor 12 must identify the ultimate source of the input for the first software component, which may not be the software component directly connected to the current software component under consideration.

In step 208, the system checks the identified component for a matching annotation. In this exemplary embodiment, the system checks that the identified software component associated with the source of input includes an annotation defining a return condition, which matches with the annotation defining the input condition for the first software component (identified in step 204).

In step 210, the system generates an alert if the identified software component does not include an annotation defining a return condition which matches with the annotation defining the input condition for the first software component. In this exemplary embodiment, after identifying the software component which is providing the input to the first software component, the identified software component is checked to ensure that the corresponding annotation is present at the identified software component. If the corresponding annotation is not present at the identified software component, then an alert is generated.

By performing the operational steps of FIG. 2, potential weaknesses in the software components are identified, in relation to their defined conditions, through the use of annotations.

Figure 3:
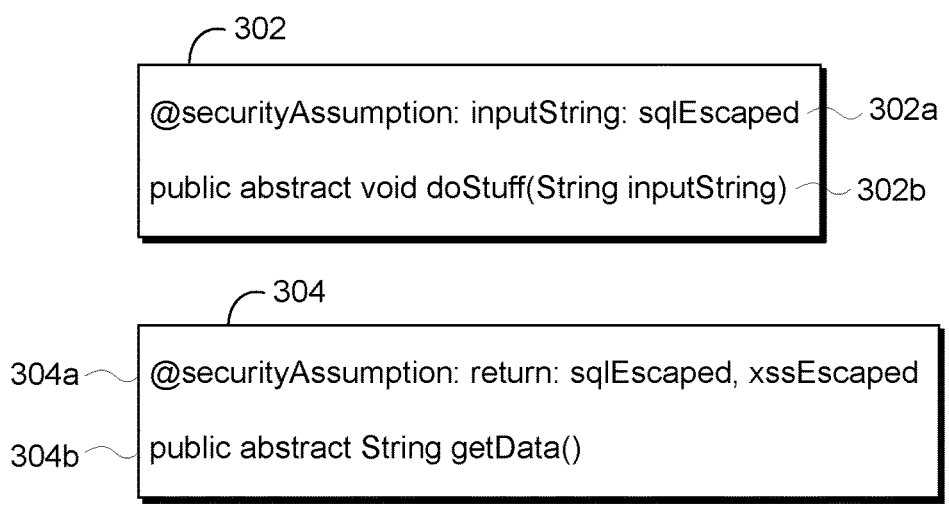
FIG. 3 depicts an example of defining security assumptions through annotations, in accordance with an embodiment of the present invention.

FIG. 3 depicts an example of defining security assumptions through annotations, in accordance with an embodiment of the present invention.

Definitions 302 and 304 highlight how a third party library can define certain security assumptions which must be met when using APIs within that library. First, formal security assumptions are detailed in the API definitions through annotations. For example, a definition may look like the following for the example "doStuff" method of definition 302:

@securityAssumption: inputString: sqlEscaped public abstract void doStuff(String inputString)

The first line (i.e., line 302a) of this example definition 302 defines a security assumption in relation to the input string for an API. When a developer uses the API, they use annotation to declare that the data being passed to the API is verified using a corresponding annotation, such as the of definition 304, as follows:

@securityAssumption: return: sqlEscaped, xssEscaped public abstract String getData( )

The first line (i.e., line 304a) of this second example definition 304 is an annotation which defines a return condition for the specific software component. A non-verified example (i.e., without the necessary annotation) may be:

public abstract String getInsecureData( )

At compile time, the developer's annotation is used to ensure that the API is used in a secure fashion, and a compile time warning will result if the API is not used in a secure fashion. Another action can be to trigger a security review of the code. The first (labelled (A)) of these two instructions would result in a compile-time warning/error while calling, whereas the second (labelled (B)) would not.

(A) doStuff(getInsecureData( ));
(B) doStuff(getData( ));

The example "doStuff" method has an annotation that defines an input condition for the method (i.e., line 302a). In this example, the condition requires that the input to the method is sqlEscaped. The "getData" method has a corresponding annotation which defines a return condition (i.e., line 304a) for the method, which states that the string returned is sqlEscaped and xssEscaped (only the sqlEscaped is relevant in this example). So the action (B) above is acceptable as there is a matching annotation in the "getData" method which matches the input condition of the annotation of the "doStuff" method. Action (A) would generate a warning at compile time, as there is no matching annotation in the "getInsecureData" method, as required by the annotation included in the "doStuff" method.

Figure 4A:
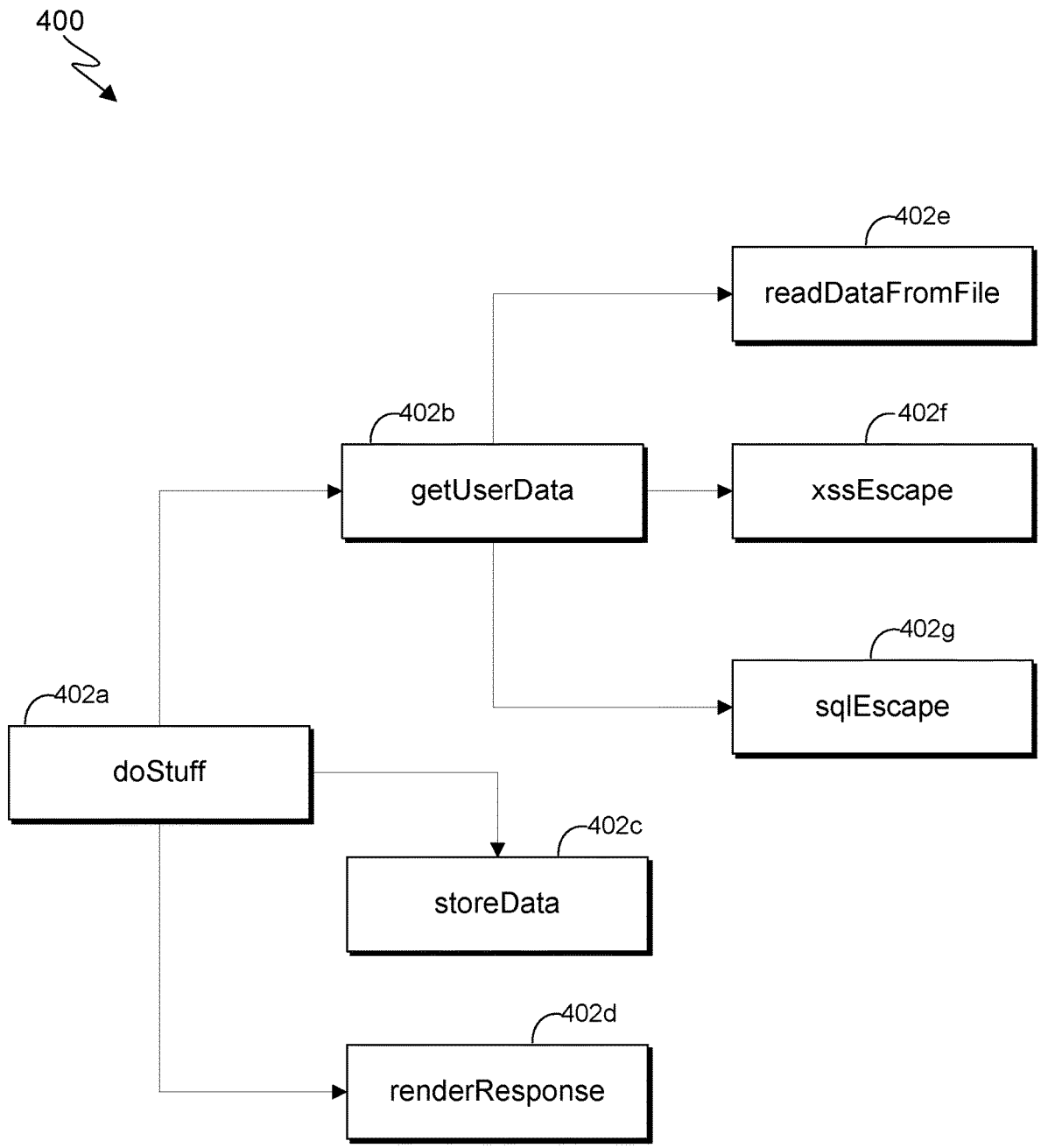
FIGS. 4A and 4B illustrate an example of various software components to verify for security using annotations, in accordance with an embodiment of the present invention.
Figure 4B:
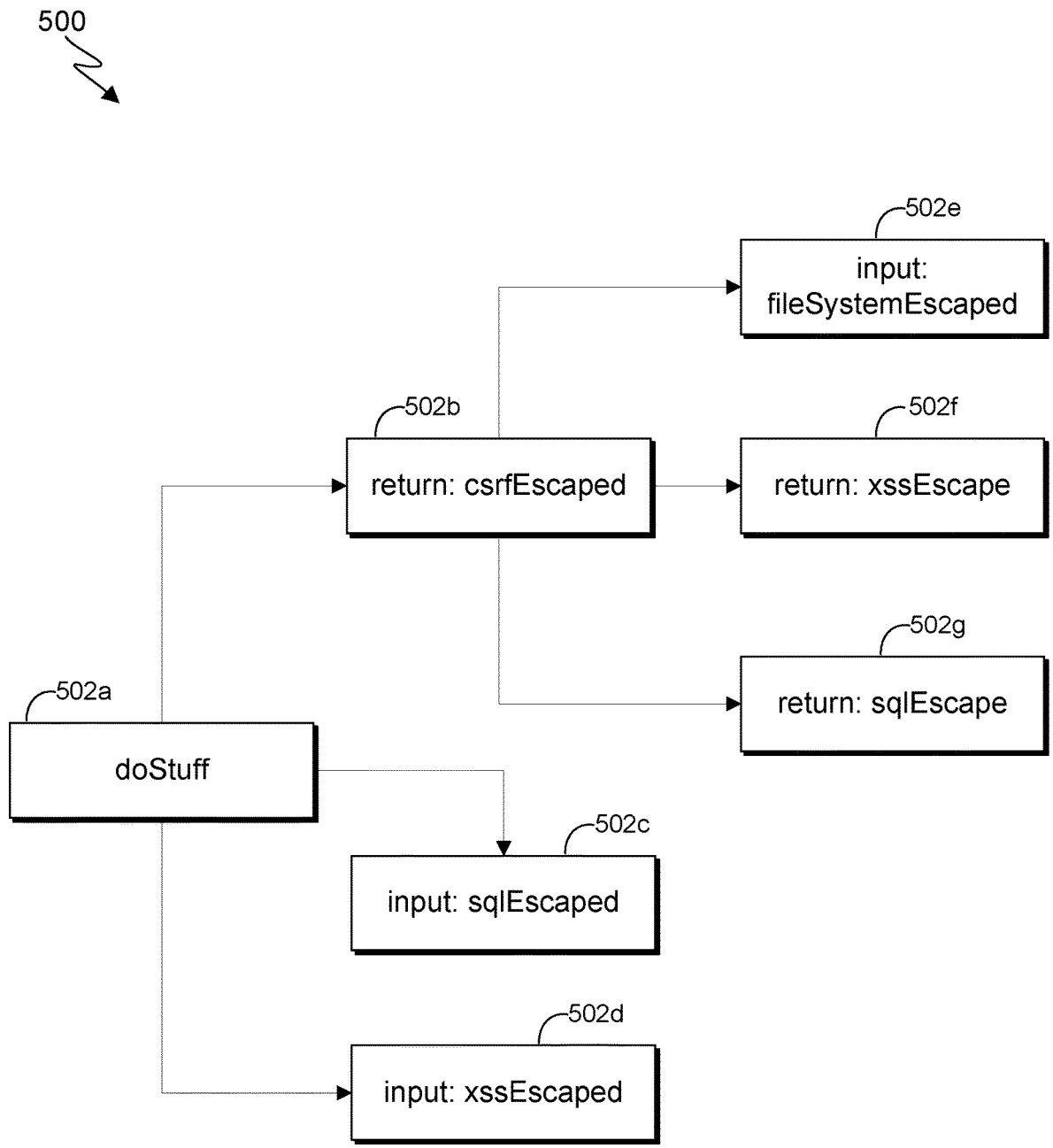

FIGS. 4A and 4B illustrate an example of various software components to verify for security using annotations, in accordance with an embodiment of the present invention.

In the example of FIG. 4A, seven different JAVA methods are shown, methods 402a-g, each one of which is considered to be a software component in the context of the processing carried out by the system of FIG. 1. In the example of FIG. 4B, the seven different JAVA methods of FIG. 4A are depicted, with an indication as to whether there is a respective annotation 502b-502g (i.e., input or return), contained within each method 402a-g. It will be noted from FIG. 4B that the starting method 502a "doStuff( )" does not have an annotation depicted. There is no requirement that all of the software components in a project include an annotation. The purpose of the methodology of FIG. 2 is to ensure that those software components that do have an annotation defining an input condition are matched by another software component in the project that has the corresponding return condition.

The arrows each indicate methods that are directly called from other methods, although the arrows do not necessarily indicate the ultimate source of input parameters used for specific methods. For example, method 402c is directly called from method 402a. It will be appreciated that in most software development projects, a large number of different software components will be present, with a large number of different interconnections, however, for ease of understanding, seven such interrelated methods are shown. These methods are linked by a hierarchy which starts with the doStuff( )method 402a and 502a, of FIGS. 4A and 4B, respectively.

The content of the individual methods is as follows:

```
doStuff( )
{
    String data = getUserData("/path/to/datastore");
    storeData(data);
    renderResponse(data);
}
@securityAssumption: return: csrfEscaped
getUserData(String filePath)
{
    String data = readDataFromFile(filePath);
    data = xssEscape(data);
    data = sqlEscape(data);
    // CSRF Escape data as well
    return data;
}
@securityAssumption: input: sqlEscaped
storeData(String data)
{
    // Write data to DB
}
@securityAssumption: input: xssEscaped
renderResponse(String responseData)
{
    // Display data to user
}
@securityAssumption: input: fileSystemEscaped
readDataFromFile(String filePath)
```

```
{
    return fileContents;
}
@securityAssumption: return: xssEscaped
xssEscape(String data)
{
    // So XSS Escaping
}
@securityAssumption: return: sqlEscaped
sqlEscape(String data)
{
    // So SQL Escaping
}
```

As can be seen from the above code and from FIGS. 4A and 4B, three of the methods 402a-g have annotations 502a-g which define input conditions, the methods storeData, renderResponse and readDataFromFile (i.e., 402c, 402d, and 402e). Three of the methods 402a-g have annotations 502a-g which define return conditions, the methods getUserData, xssEscape and sqlEscape (i.e., 402b, 402f, and 402g). Although the getUserData method 402b does not explicitly assert "xssEscaped" or "sqlEscaped", the method 402b implicitly asserts both, by virtue of the "securityAssumptions" asserted by the "xssEscape" and "sqlEscape" methods (i.e., methods 402f and 402g, respectively), which are called by this method 402b. The different input conditions exist for the purpose of ensuring that the desired security requirements for specific software components are met within the software development project being developed, which can be determined at compile time, or during the creation or amendment of methods.

Assuming that the storeData method 402c is considered first, this method 402c has the annotation 502c which defines an input condition that the input must have been "sqlEscaped" (as depicted in FIG. 4B and in the text of the method which is listed above). The "doStuff" method 402a, which calls the storeData method 402c, does not have a matching return annotation, but the string data that is sent to storeData method 402c is generated by the getUserData method 402b, which again does not assert the necessary return annotation. However, traversing through the depicted methods, the getUserData method 402b includes a call with the string data to the sqlEscape method 402g, which does assert the correct annotation, "return: sqlEscaped" (i.e., annotation 502g of FIG. 4B), matching the input condition of the storeData method 402c (i.e., annotation 502c of FIG. 4B).

The process of identifying a software component that generates an input for the software component under consideration (e.g., the storeData method 402c) comprises determining a route through multiple software components to the ultimate source of the input for the software component. The same process can validate the annotation defining the input condition for the renderResponse method 402d in respect to annotation 502d (i.e., input: xssEscaped condition) for the input to this method (see FIG. 4B and the text of the method above).

The third method which has an annotation 502e that defines an input condition is the readDataFromFile method 402e, which has the input condition that the input is fileSystemEscaped (see FIG. 4B and the text of the method above). This input is provided by the getUserData method 402b, and there is no path to any method 402a-402g, which provides a matching return annotation 502b-g, amongst the methods shown. Data passed to the readDataFromFile method 402e should be "fileSystemEscaped" (i.e., annotation 502e), however, there is not an example method 402a-g which asserts this, and an output would be generated since the identified method that provides the input to the readDataFromFile method 402e does not have a matching return annotation 502a-g. An error message would be produced.

In this way all of the different methods 402a-g with annotations 502a-g defining input conditions are checked to ensure that there is a method 402a-g with a matching annotation 502b-g defining a return condition. This done by the processor, which determines all software components that include annotations 502a-g defining input conditions for the respective software components, and repeats the identifying of the software components that generate an input for the respective software component, checking of matching annotations, and generating an output accordingly, for all such determined software components.

Although the method 402b getUserData in FIG. 4A does not assert either xxsEscaped or sqlEscaped as return conditions in its annotations 502b (since these are implicit through the calling of the xssEscape and sqlEscaped methods), one or both of these conditions can be contained within the annotation for the method 402b. Whether this is the case or not will depend on the order in which methods are created, and the preferred development styles of the author(s) in question. It may be considered good practice to only assert return conditions that are explicitly satisfied by the method in question, such as the csrfEscaped return condition (i.e., annotation 502b) in the getUserData method 402b, rather than asserting those conditions implicit from other methods, but this is a design choice of the author(s) of the software components.

However, if the getUserData method 402b did include an annotation 502b that defined two return conditions, xssEscaped and sqlEscaped, based on the calls made within the method (rather than actions taken directly by the method), then care may be taken in any amendment of the actual methods that do provide the specific function asserted in the return condition. In this case, it is desirable for the processor that is running the software development kit to be operated to monitor amendments to software components that include annotations defining return conditions. Extra attention may be requested if a method is modified which asserts a return condition, and is called by another method that also asserts the same condition as an implicit, rather than explicit, result.

If the processor receives a user input defining a change for a specific software component that includes an annotation defining a return condition, and determines that the specific software component receives an input from a further software component that also includes an annotation defining the same return condition, then the processor can generate an output detailing the linked further software component. In the example of FIGS. 4A and 4B, if the getUserData method 402b did include an annotation for the return condition "xssEscaped" (which it could, since it calls the method 402f xssEscape), then any change to the actual xssEscape method 402f would be immediately flagged to the developer, in the light of the fact that the getUserData method 402b depends on the xssEscape method 402f for the fulfillment of the actual xssEscaping covered by the annotation 502f.

Figure 5:
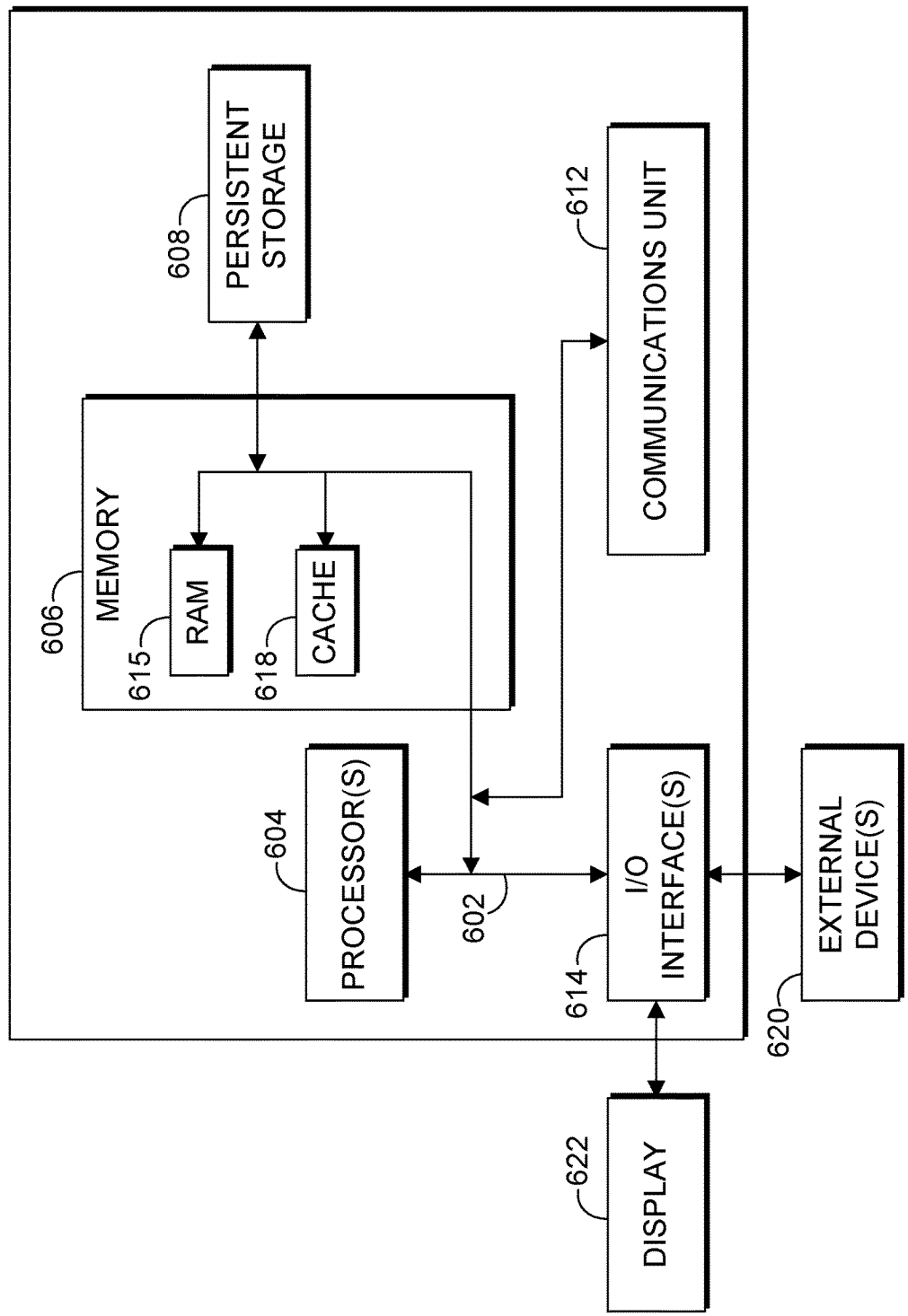
FIG. 5 is a block diagram of internal and external components of the computing device of FIG. 1, in accordance with an embodiment of the present invention.

FIG. 5 is a block diagram of internal and external components of a computing device 600, which is representative of the computing device of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computing device 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 616 and cache memory 618. In general, memory 606 can include any suitable volatile or non-volatile computer readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer readable storage medium that is also part of persistent storage 608.

Communications unit 612 provides for communications with other computer systems or devices via a network. In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 600 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computing device 600. For example, I/O interface 614 can provide a connection to one or more external devices 620 such as a keyboard, computer mouse, touch screen, virtual keyboard, touch pad, pointing device, or other human interface devices. External devices 620 can also include portable computer readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising: determining, by one or more processors, a first software component, wherein the first software component comprises a first annotation defining an input condition for the first software component, wherein the input condition defines acceptable input strings for the first software component based on a first security constraint; validating, by one or more processors, the first annotation defining the input condition for first software component by identifying a route to a source for an input of the first software component through a plurality of additional software components, wherein a second software component comprises the source for the input for the first software component; determining, by one or more processors, whether the second software component includes a second annotation defining a return condition for the second software component which matches the first annotation defining the input condition for the first software component, wherein the return condition defines acceptable return strings for the second software component; and in response to determining that the second software component does not include the second annotation defining the return condition which matches the first annotation defining the input condition for the first software component, generating, by one or more processors, an output, wherein determining that the second software component does not include the second annotation defining the return condition which matches the first annotation defining the input condition for the first software component identifies a security weakness in a plurality of software components; wherein the first annotation defining the input condition for the first software component comprises a security assumption for the input to the first software component, where the first annotation declares that the data being passed to an application program interface (API) is verified at compile time using a second corresponding annotation, and wherein the security assumption is a third party library defined return condition for a specific software component detailed in an API definition for the API when used within the third party library.

2. The method of claim 1, further comprising: accessing, by one or more processors, the plurality of software components.

3. The method of claim 1, further comprising: determining, by one or more processors, a set of software components from the plurality of software components, wherein the set of software components comprises an annotation, and wherein the annotation comprises input conditions for the set of software components.

4. The method of claim 1, further comprising: receiving, by one or more processors, a user input defining a change for a third software component, wherein the user input comprises an annotation defining a return condition for the third software component; and determining, by one or more processors, that the third software component receives an input from a fourth software component, wherein the fourth software component includes an annotation defining the return condition for the third software component.

5. The method of claim 4, further comprising: generating, by one or more processors, an output, wherein the output comprises information associated with the fourth software component.

\* \* \* \* \*